Feb. 22, 1927.
J. T. SNAPP
EGG SHELLER
Filed June 25, 1926
1,618,682
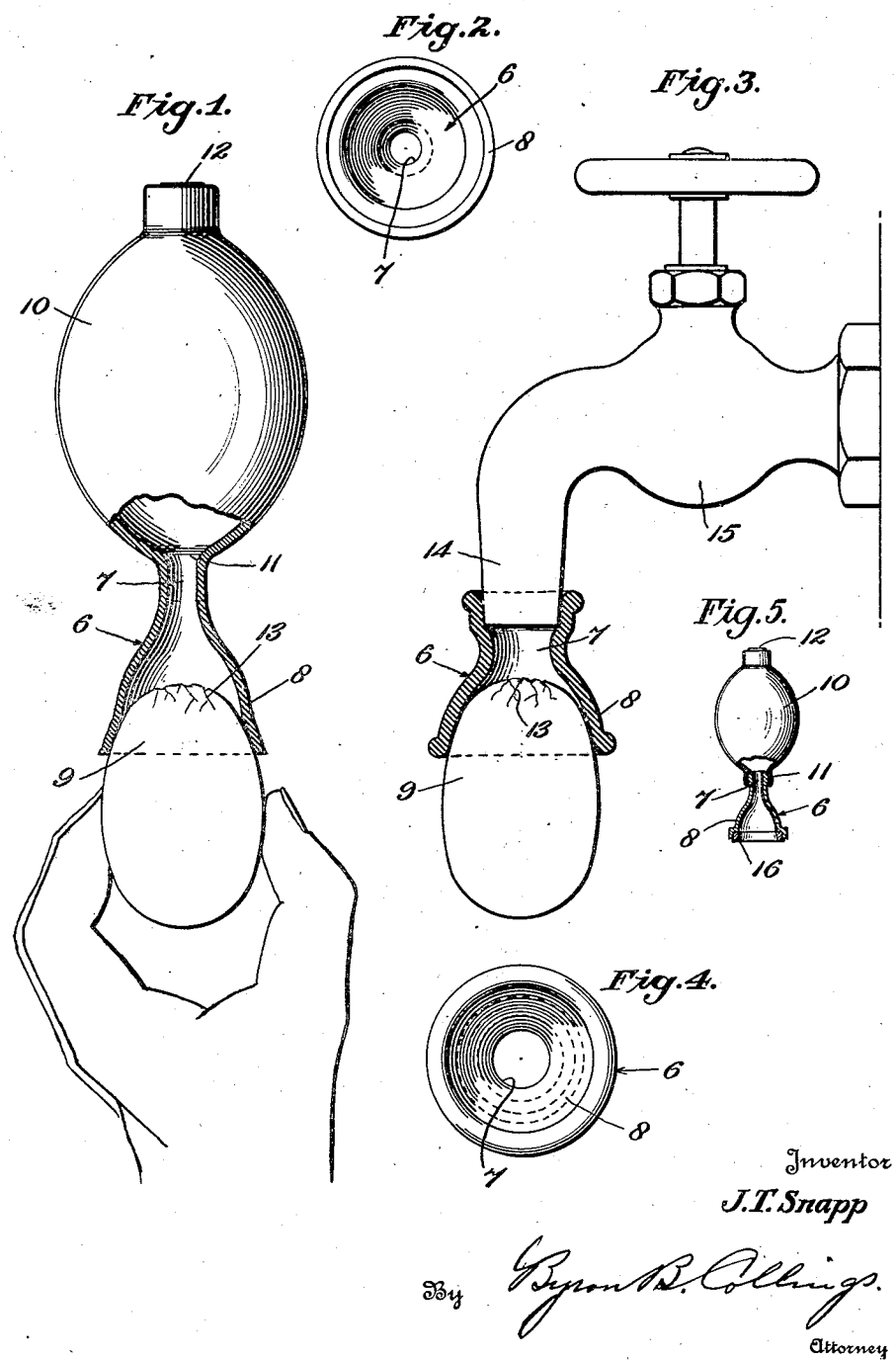
Inventor
J. T. Snapp
By Byron B. Collings.
Attorney Patented Feb. 22, 1927.

1,618,682

UNITED STATES PATENT OFFICE.

JOHN T. SNAPP, OF BLACKWELL, OKLAHOMA.

EGG SHELLER.

Application filed June 25, 1926. Serial No. 118,610.

This invention relates to devices for removing the shells from hard boiled eggs and has for one of its objects to produce a device of this character which will be simple in construction, comparatively inexpensive to manufacture and more efficient in use than those which have been heretofore proposed.

With the above and other objects in view which will appear as the description proceeds, the invention consists in the novel details of construction and combinations and arrangements of parts more fully hereinafter described and particularly pointed out in the appended claims.

Referring to the accompanying drawings forming a part of this specification in which like reference characters designate like parts in all the views:

Figure 1 is an elevational view partly in section of one form of the device, constructed in accordance with the present invention, showing the same in use;

Fig. 2 is a bottom plan view of the device shown in Fig. 1;

Fig. 3 is a sectional elevational view of a somewhat modified form of the device;

Fig. 4 is a bottom plan view of a portion of the apparatus shown in Fig. 3; and

Fig. 5 is a view similar to Fig. 1 of a further modified form of the apparatus.

Referring more especially to Figs. 1 and 2, the shelling device comprises a substantially bell shaped cup member 6 which is preferably formed of a resilient material such as rubber and which is provided with a restricted throat 7 and a flared portion 8 which latter is adapted to receive and tightly embrace an end portion of an egg 9. A rubber or other resilient bulb 10 has an outlet 11, integrally formed with the restricted throat 7 of the cup member 6 and the said bulb 10 is also provided with a check valve 12 which will permit entrance of air into the said bulb at its upper end but which will prevent the exit of air thereform.

The manner of using the form of the invention shown in Fig. 1 will be clear from the said figure, it being understood that the egg shell is first fractured by striking with a blunt instrument or knocking against some hard object, whereupon the flared portion 8 of the cup member 6 is caused to tightly embrace the fractured end of the egg shell, the egg being held in one hand, as shown, whereupon by alternately squeezing and releasing the resilient bulb 10 with the other hand, air under pressure will be forced through the outlet 11 of the said bulb, through the restricted throat 7 and into the interior of the cup member 6 where it will find its way through the cracks or fractures 13 which have already been produced in the egg shell to the interior of the said shell and will split the shell and the inner skin of the egg so that they may be readily removed from the white and yoke without injury thereto.

In the form shown in Figs. 3 and 4, the cup member 6, is still provided with the restricted throat 7 and the flared portion 8 but its upper end instead of being integrally formed with a pressure producing bulb is adapted to receive the outlet portion 14 of a water or other faucet 15, whereby water or other fluid, under pressure may be introduced into the cup member 6, as will be readily understood.

The form of the invention illustrated in Fig. 5 is analogous to that shown in Fig. 1, except that the cup member 6 may be formed of metal, hard rubber or the like and is provided with a resilient or yielding washer member 16 in its lower end which is adapted to engage and form a tight joint with the egg shell. In this form of the invention, the resilient bulb 10 is, of course, manufactured as a separate element and its outlet portion 11 is engaged with the restricted throat 7 of the cup member 6 by slipping over the exterior thereof, as illustrated.

It will thus be seen that all forms of the invention provide a simple and efficient means whereby after the egg shell has been partially fractured it may be quickly and conveniently removed.

It is obvious that those skilled in the art may vary the details of construction as well as the precise arrangements of parts without departing from the spirit of the invention and therefore, it is not wished to be limited to the above disclosure except as may be required by the claims.

What is claimed is:

1. A device of the class described, comprising a tubular member having a restricted throat and a flared portion adapted to tightly embrace a portion of an egg shell; and means in axial alignment with and connected to said throat for forcing a fluid under pressure into said member.

2. A device of the class described, comprising a cup-like member having a restricted throat and a flared portion adapted to tightly embrace a portion of an egg shell; and a resilient bulb connected to said throat, for forcing a fluid under pressure into said member.

3. A device of the class described, comprising a cup-like member having a restricted throat and a flared portion adapted to tightly embrace a portion of an egg shell; and a resilient valved bulb having an outlet formed integrally with said throat, for forcing a fluid under pressure into said member.

In testimony whereof I affix my signature.

JOHN T. SNAPP.